United States Patent [19]

Komine et al.

[11] 4,076,396
[45] Feb. 28, 1978

[54] CINECAMERA EQUIPMENT CAPABLE OF SYNCHRONOUS SOUND RECORDING

[75] Inventors: Yoshio Komine; Hiroshi Furukawa, both of Tokyo; Kiyoshi Takahashi, Kunitachi; Tomoshi Takigawa, Machida; Mitsutoshi Ogiso, Kawasaki; Toshikazu Ichiyanagi, Tokyo, all of Japan

[73] Assignee: Canon Kabushiki Kaisha, Tokyo, Japan

[21] Appl. No.: 459,220

[22] Filed: Apr. 8, 1974

Related U.S. Application Data

[63] Continuation of Ser. No. 304,496, Nov. 7, 1972, abandoned.

[30] Foreign Application Priority Data

Nov. 8, 1971 Japan .................................. 46-88891
Nov. 11, 1971 Japan .................................. 46-108660
Nov. 13, 1971 Japan .................................. 46-90985

[51] Int. Cl.² ............................................ G03B 23/06
[52] U.S. Cl. ........................................ 352/29; 352/72
[58] Field of Search ..................... 352/26, 27, 29, 72, 352/78, 92, 78 C

[56] References Cited

U.S. PATENT DOCUMENTS

3,442,580  5/1969  Winkler .............................. 352/72 X
3,756,714  9/1973  Caraway .............................. 352/27

*Primary Examiner*—L. T. Hix
*Assistant Examiner*—Alan Mathews
*Attorney, Agent, or Firm*—Toren, McGeady and Stanger

[57] ABSTRACT

A motion picture camera is adapted to receive a film magazine containing a roll of sound recordable photographic film. A housing forms a chamber to receive the magazine. A cover opens and closes the chamber. A recording system records sound signals on the film. A setting arrangement engages the recorder system and the film with each other so as to record signals. The setting arrangement is movable into a first position where the film engages the recorder and a second position where the film is disengaged from the recorder so as to be incapable of recording sound signals. A transport device is coupled to the setting arrangement in the first position when the recorder is in the first position. And an interconnecting system responds to closure of the cover for moving the setting arrangement from the second position to the first position so that the camera can be set for sound signal recording in response to the closing of the cover.

10 Claims, 16 Drawing Figures

CINECAMERA EQUIPMENT CAPABLE OF SYNCHRONOUS SOUND RECORDING

This is a continuation of application Ser. No. 304,496, filed Nov. 7, 1972, now abandoned.

BACKGROUND OF THE INVENTION

1. Field of the Invention

The invention relates to a motion picture camera having a film driving mechanism and synchronous sound recording system, especially to a motion picture camera having a mechanism to drive a film at a constant speed, to feed the film contained in the magazine for, and to lead the film out of the magazine for sound recording.

2. Description of the prior art

Because until now it was impossible to record sounds on the film itself contained in a magazine or the like, in order to take a motion picture with the film contained in a magazine or the like and at the same time record sounds, a specially prepared sound recording equipment such as tape recorder was used, and driven synchronously with the feed of film.

However, such method is so complicated that mishandling often takes place a mishandling or such a considerable time is spent in the preparation of handling that chances for taking pictures are often lost. This is very inconvenient in practice.

In the meantime, a magazine to contain a film was disclosed, out of which magazine the film can be led for synchronous sound recording. For example, with the U.S. Pat. No. 3,561,851 a film magazine, out of which the film is led, is disclosed.

When a so-called sound film presenting at the end sound recording means and capable of synchronous sound recording is loaded in a motion picture camera and the picture informations the sound informations are recorded, it is necessary to pay more attention to handling than with a conventional motion picture camera. For example, it is considered to be essential to provide a safety device or a means to discharge a channel formed outside of the magazine for the film, lest the cover of film chamber should be opened carelessly and the film led out of the magazine be exposed to the light. Thus what is desired is a new kind of motion picture which even an unskilled photographer can easily handle.

SUMMARY OF THE INVENTION

The purpose of the present invention is to provide a motion picture camera with which sounds can be recorded at the same time as pictures.

The present invention involves providing a motion picture camera which possesses a means to form a film channel outside of the film magazine to lead the film contained in a magazine and capable of sound recording out of the magazine and again to lead in the magazine after recording, a means to drive the film led out of the film magazine, a means to detect the film existing out of the film magazine and a locking means receiving an electrical or a mechanical signal from said detecting means and prohibiting the opening of the cover of magazine chamber before finishing of the film.

Another purpose of the present invention is to provide a motion picture camera which possesses a means to form a film channel outside of the film magazine to lead the film out of the magazine, to drive the film and to lead the film into the magazine, a means to drive the film along a channel outside of the magazine and a means to bring at least one of the above two means on the discharging position by means of the opening operation of the cover of the magazine chamber.

Another purpose of the present invention is to provide a motion picture camera in which a magazine can be used by which magazine the channel for film can be changed from the channel inside of the magazine into that outside of the magazine and again into that inside of the magazine, and which possesses as a demountable accessory on its body at least one of means to feed the film inside of the magazine intermittently on its body, a means to drive the film existing outside of the magazine, a means to record sound signals on the film running in the channel outside of the magazine, a means to switch the film channel inside of the magazine over to that outside of the magazine.

Further purposes and features of the present invention will be disclosed from the below mentioned detailed explanation of the invention along with the drawing.

DESCRIPTION OF THE PREFERRED EMBODIMENT

The magazine disclosed in the U.S. Pat. No. 3,561,851 and containing a film capable of synchronous sound recording is shown in FIGS. 1 to 4.

Figure 1:
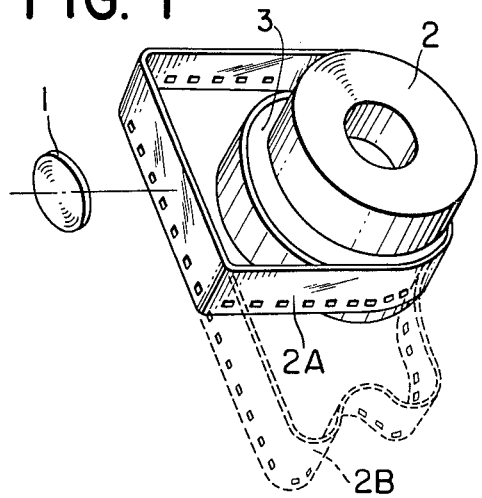
FIG. 1 shows in perspective a film roll contained in a conventional magazine, by which the film channels are changeable.
Figure 2:
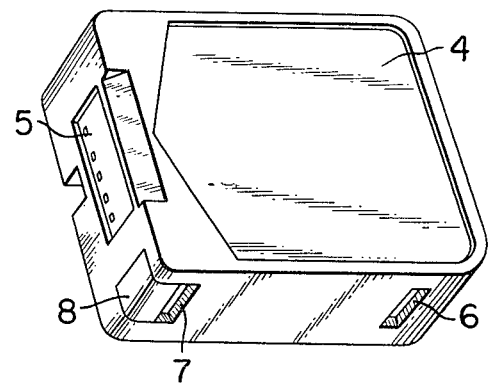
FIG. 2 shows the magazine containing said film in perspective.
Figure 3:
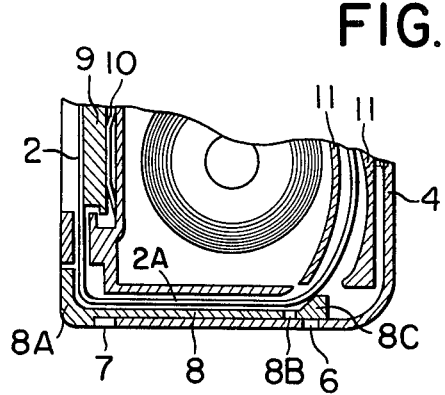
FIG. 3 shows a partial section to show the film channel inside of the magazine.
Figure 4:
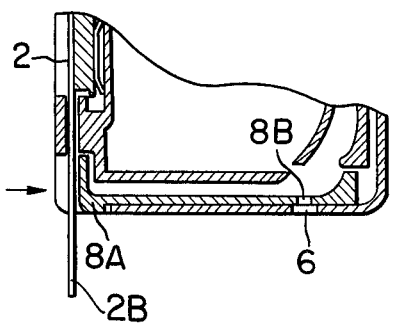
FIG. 4 shows a partial section, whereby the film channel is switched over to lead the film out of the magazine of FIG. 3.
Figure 8:
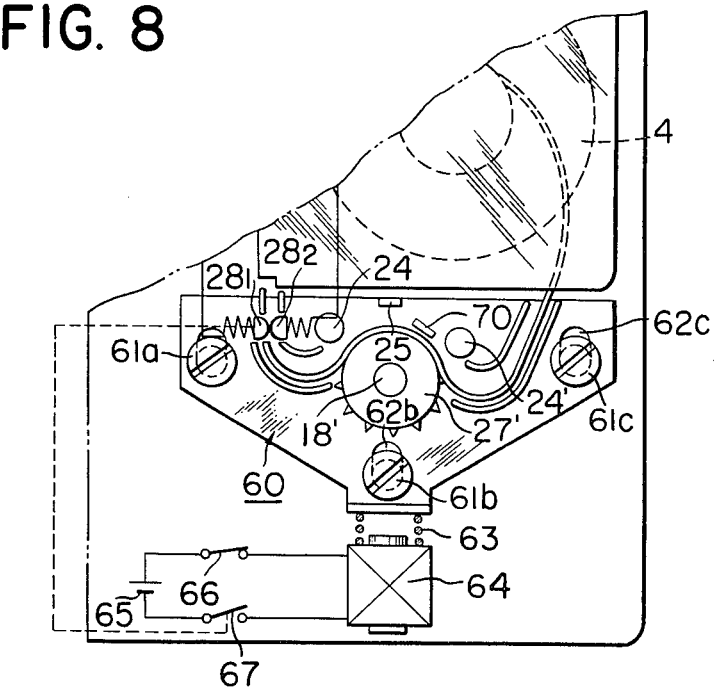
FIG. 8 shows a front view of a motion picture camera of FIG. 7, whose cover is opened after finishing recording of pictures and sounds.

FIG. 1 shows the running route of a film in roll contained in a film container such as magazine, whereby 1 is a camera lens, 2 a film roll at feeding side and 3 a reel at winding side. The portion designated 2A is a part of the film running along the film channel provided in advance in the magazine (hereinafter called film channel inside of magazine). The portion designated 2B is a part of the film running along the channel in which the film is led out of the magazine and fed (hereinafter called film channel outside of the magazine). A member to control the switching of the film channel inside of the magazine to that outside of the magazine or vice versa is provided under the film gate 5 of the magazine 4 as shown at 8 in FIG. 2. The section of the lower part of the magazine 4 containing this switching member of FIG. 2 is shown in FIG. 3 for a better understanding. In FIG. 3 the switching member 8 is situated in a position such that the film channel inside of the magazine is formed, and so that the switching member 8 is slidable toward the right. The structure designated 8A is the head of the switching member, which protrudes on the lower surface of the front part of the magazine in such a manner that the head engages with other means to move the switching member towards the right. The structure designated 8B is an opening for the film channel running through the switching member 8, so that when the switching member 8 slides toward the right, the axis of the opening 8B aligns with that of the opening 6 provided on the lower surface of the magazine, and so as to form a channel through which the film once led out of the magazine can again be led into the magazine. The structure designated 8C is the tail of the magazine serving as a film guide and presenting a form to control the running direction of the film. When the switching member is not moved towards the right as shown in FIG. 3, and the film channel inside of the magazine is formed, the openings 6 and 7 on the lower surface of the magazine are covered by the switching member 8. The latter situated as shown in FIG. 8 so that the light from outside is cut off. When the head 8A is pressed along the direction of arrow in FIG. 4 and the switching member 8 is moved toward the right, the opening 8B of the switching member 8 and the opening 6 on the lower surface of the magazine align with each other to form an inlet opening to allow the film led out of the magazine to be led into the magazine. In this way the film led out of the magazine as shown in FIG. 4 can form a film channel as shown at 2B in FIG. 4.

In FIG. 3 member 9 is a film press plate, while 10 is a press spring and 11 a film guide provided on the magazine.

With such a magazine, the film exposed to the light coming through the aperture and the film gate 5 of the magazine is drawn straight down out of the magazine chamber by operating the switching member 8. The film passes through the film channel outside of the magazine.

The film gate can be engaged with a mechanism to feed the film forwards or backwards. Further on the film channel outside of the magazine a driving mechanism with stabilized feeding speed can be provided to encode the sound recording band on the film with a sound signal or/and a control signal for the sound reproducing mechanism of cine-projector.

Figure 5:
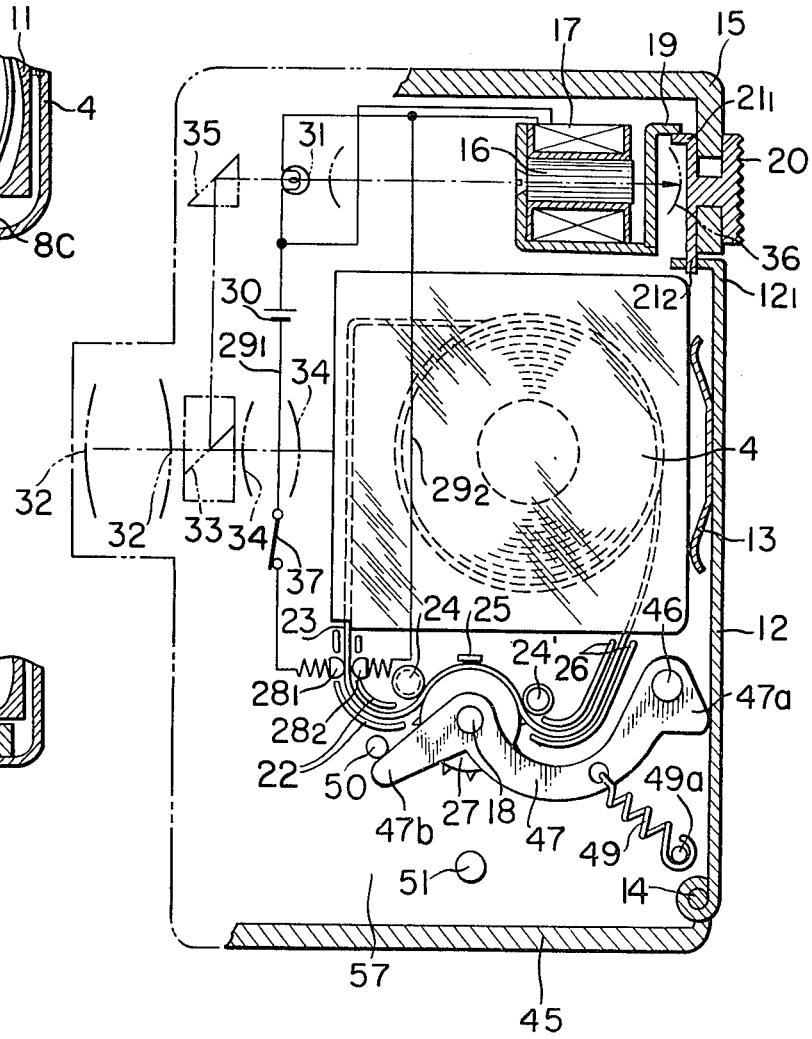
FIG. 5 shows a partial section to show the internal disposition of the motion picture camera according to the present invention capable of synchronous sound recording in which the conventional magazine of FIG. 1 to FIG. 4 can be used, whereby the sounds are recorded synchronously with picture.
Figure 6:
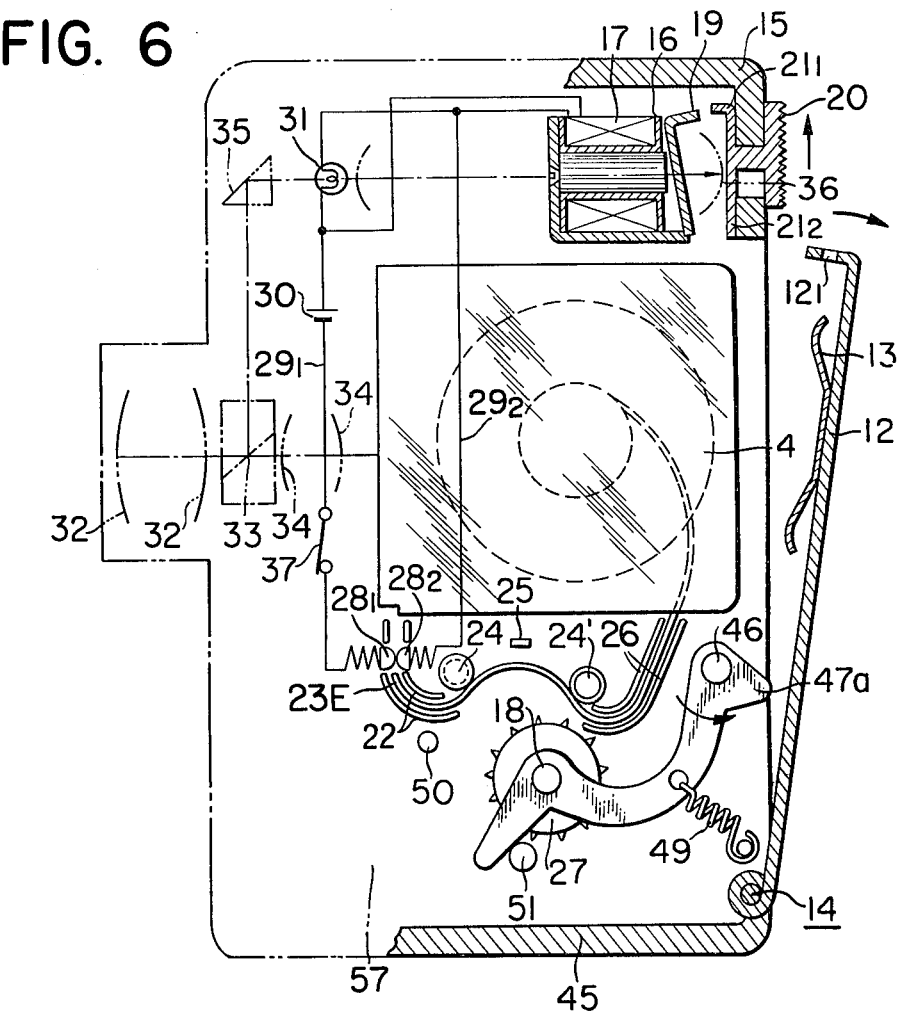
FIG. 6 shows a section of the motion picture camera of FIG. 5 whose cover is opened after finishing recording of pictures and sounds.

FIGS. 5 and 6 show important components of the motion picture camera according to the invention. In FIG. 5 the motion picture camera during cranking is shown, while in FIG. 6 that after finishing of cranking, when the cover is opened. Drawn straight down out of the magazine chamber 4 is the magazine mentioned above from which the film can be led out. The magazine 4, is pressed by a spring 13 or the like provided on a cover 12 of the magazine chamber to the right in the drawing, so as to keep it at a certain position inside of the camera. The cover 12 bears an axis secured on the camera body and can be rotated along the clockwise direction in FIG. 5. The camera cover 15 is mounted to cover the opening of the magazine chamber in order to prevent light from entering into the film chamber. Film guides 22 and 26 are the film guide to control the film channel outside of the magazine, while 24 and 24′ are a pair of guide rollers provided rotatably on the camera body. These guides and rollers make means to form the channel for the film 23 led out of the magazine. An axis 18 on the camera body supports the sprocket 27 rotatably. The axis 18 of the sprocket is at the position shown in FIG. 5 connected with a film driving source not shown. The sprocket is driven at a constant speed along the clockwise direction to feed the film at a constant speed. An optical or a magnetic head 25 records a sound signal on the film and can be any photoelectrical or electromagnetic transducing means, such as a light emitting diode, responsive to the output of a microphone demountably provided on the camera. The driving action of the above mentioned sprocket can be replaced with that of a capstan and pinch roll.

Contact switches $28_1$ and $28_2$ on the film channel outside of the magazine detect the presence of film. These switches can be in the form of any means to detect the termination of film, for example, by detecting whether a counterclockwise frictional force from the film is applied to the guide roller 24 or 24′ or by providing the switches on both sides of the film channel in such a manner that at the termination of film both switches close a circuit. It is desirable that this film detecting means should be provided at the back end of the film guide 26 or near the film inlet opening of the magazine in FIG. 5 and FIG. 6 in order to prevent as much film as possible outside of the magazine from being exposed to the light when the cover is opened. Further, it is also desirable that the switches or the like should not come in contact with the photographing band on the film or the sound recording band or the like. In case the switches or the like are provided on the perforated part, it is further necessary that they be sufficiently large in order to avoid the vibration due to the perforations. A means to disengage the locking means for the cover 12 which is explained later is composed of these means.

Forming a locking means for the cover 12 are an electromagnetic plunger 16, its coil 17 and an iron piece 19 usually given a moment along the clockwise direction by a spring not shown in the drawing and to be attracted by the electromagnetic plunger 16 as well as a slidable knob 20 presenting a stopping part $21_1$ engageable with the iron piece 19. The other end $21_2$ opposite to the one end $21_1$ of this knob 20 engaged the slot 31 in the cover 12 with an adaptor. Of course the above is one of the examples and a purely mechanical locking device or other conventional locking device is also applicable. Two conductors $29_1$ and $29_2$ connect the contact switch $28_1$ and switch $28_2$ with the coil end of the electromagnetic plunger, for which element 30 is an electric source for direct current. A switch 37 for the electrical source can be used as a main switch of the camera. The contact switches $28_1$ and $28_2$ connect a lamp 31 to the electrical direct current source 30. When the contact switches complete a circuit at the termination of film the lamp is lighted and this is indicated at the finder 36 of the camera to give warning to the operator of the camera. Members 32 and 34 are the photographing lens means of the motion picture camera. A half-mirror 33 inserted between the lenses 32 and 34 divides the light coming from the photographic object into two. One beam advances straight through the aperture not shown in the drawing of the camera and reaches the film. The other light beam changes its path at 90° and at the prism 35 again its path at 90° to reach the finder 36.

The reason why the film guides 22 and 26 are curved so as to form a loop of film is that the film inside of the magazine is fed intermittently at the film gate not shown in the drawing by means of claws or other conventional means while in the channel outside of the magazine the film must be fed at a constant speed in order to allow a synchronous sound recording. Thus the difference in film feeds due to the different driving must be absorbed. Member 47 is a lever bearing the sprocket axis 18 and is pressed along the anticlockwise direction by means of a spring 49 which is hung with the one end on a fixed axis 49a. The one end 47a of the lever 47a forms protrusion and engages the cover 12 in such a manner that when the cover is closed a restrictive force is applied to the lever 47 from the cover along the clockwise direction in the drawing, so that the lever 47 is kept in a position shown in FIG. 1 against the force of the spring 49. Stoppers 50 and 51 engage the other end 47b of the lever so as to restrict the rotary zone of the lever 47. During cranking, the sprocket axis 18 is connected with a driving mechanism built-in the camera body but not shown and structured so the mechanical connection is disengaged by the anticlockwise rotation of the lever 47. Any conventional disengaging mechanism can be applied, for example, to discharge the gear engagement. Member 45 is the lower wall of the camera.

The operation of the locking device designed as mentioned above of the motion picture camera will be explained below according to FIGS. 5 and 6. In FIG. 6 the cover 12 has been turned around the axis 14 along the clockwise direction according to the arrow in such a manner that at the termination of cranking the magazine can be taken out. In the figure is seen the film end 23E engaging in the film guides 22 in the left of the drawing. The opening operation of the cover 12 is explained in sequence. Because in the channel in the film guides 22 there exists no film more, the contact switches $28_1$ and $28_2$ make a circuit, while the warning lamp 31 lights in the finder and the electrical plunger 16 is excited, so that the iron piece 19 engaging with the stopping $21_1$ as shown in FIG. 5 is attracted and the engagement is discharged as shown in FIG. 6. In this state the knob 20 is slidable upwards as shown by the arrow in FIG. 6, whereby being slided for example by means of hand the adapting part $21_2$ of the knob 20 can be disengaged from the slot $12_1$ in the cover 12 in such a manner that due to the strength of the press spring 13 for the magazine the cover 12 is opened as shown in FIG. 6 and the magazine can be taken out.

In order to load a new magazine containing an unexposed film a magazine is first inserted. After insertion the magazine the cover 12 is closed, the knob 20 is pushed downwards in the drawing, while the adapting part $21_2$ is inserted in the slot $12_1$ of the cover 12 as shown in the drawing in such a manner that the cover is locked. Unless the main switch 37 is then opened, the iron piece 19 remains attracted by the electromagnet. After the light from outside is thus cut off, the feeding of film is begun in such a manner that in a short time the end of the film leader appears outside of the magazine and the contact switches $28_1$ and $28_2$ are opened. When the warning lamp 31 is put out current running through the electrical magnet 16 is cut. The iron piece 19 is turned along the clockwise direction by a spring not shown in the drawing to engage with the stopping part $21_1$ of the knob. The knob 20 is locked in a position where the knob 20 engages with the cover 12. Thus pictures and sounds can be simultaneously recorded on a film and the circuit for the sound recording can be cut according to the necessity. When the film is being fed, and the contact switches are kept open, the cover 12 cannot be opened because the knob 20 is locked.

The operation to discharge the film channel is as follows. When the cover 12 of the magazine chamber 57 in the camera is closed and the cranking is begun, the release button of the camera being pushed, while the film is made run along the channel outside of the magazine to carry out the synchronous recording of sound signals, the film is fed in a state as shown in FIG. 5, because the lever end 47a is restricted by the cover 12. When the unexposed film in the magazine is terminated, the film end passes through the contact switches $28_1$ and $28_2$ in the film channel outside of the magazine in such a manner that the contact switches $28_1$ and $28_2$ close and as mentioned above the electromagnet attracts the iron piece 19 in such a manner that the operation of the knob 20 becomes possible. When the cover 12 is opened as shown in FIG. 6 by operating the knob 20, the restrictive strength working on the end 47a of the lever 47 disappears. This occurs so that the lever 47 is turned around the axis 46 along the anticlockwise direction as shown in FIG. 6. This is due to the force of the spring 49 until the other end 47b strikes at the stopper 51. Thus the sprocket 27 on the lever 47 is also disengaged from a position to feed film. Thus the magazine can be taken out along the vertical direction to the plane of FIG. 6 exchanged against a new one. When the new magazine is loaded and the cover 12 is closed, the end 47a of the lever 47 is pushed by the cover 12 and enters into a state as shown in FIG. 5.

In the above mentioned explanation, an example of mechanical method for discharge is given, while it is also possible that in connection with the motion of the cover to take an opened position the lever 47 is electromagnetically disengaged by means of a plunger or the like.

Figure 7:
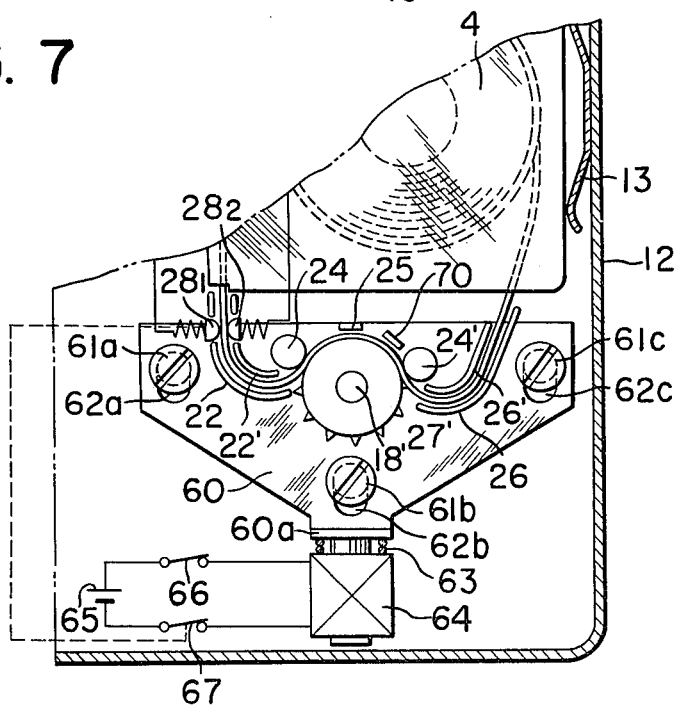
FIG. 7 shows a partial section of a variation of the motion picture camera of FIG. 5 and FIG. 6.

FIGS. 7 and 8 show partially important part of a motion picture camera in which the other embodiment of the channel disengaging device according to the invention is applied, whereby FIG. 7 shows the state during cranking while FIG. 8 the state after finishing cranking in which state the film channel is disengaged. In this embodiment the parts in common with those of the former embodiment bear the same figures, while the parts corresponding to those bear also the same figures but with dash. 18' is a sprocket axis being rotatably mounted on the camera body and intended to make the sprocket 27' rotate by means of a driving mechanism not shown in the drawing. Member 60 is a support plate bearing internal film guides 22' and 26' of the guides for the film running through the channel outside of the chamber and the guide rollers 24, 24' as well as an optical or a magnetic head 25 slidably upwards and downwards in the drawing. Members 61a, 61b and 61c are pins being secured on the camera body, which pins are adaptable into the slots 62a, 62b and 62c provided in the support plate 60 to control the sliding direction and quantity of the support plate 60. Member 64 is a magnet of a plunger, whose working iron piece, being supplied with current, attracts the bottom 60a of the support plate 60 and make the plate 60 slide downwards against the spring 63. Member 65 is an electrical source for the plunger magnet and also serves as an electrical source for other driving mechanism. Member 66 is a main switch for the electrical source, while 67 is a conventional switch being connected with the camera body and the cover so as to operate in such a manner that it is switched on when the cover of the camera is closed while it is switched off when the cover is opened. The switch 67 can be put in functional connection with the contact switches $28_1$ and $28_2$ mentioned according to 5 and 6 in such a manner that in connection with the closure of the contact switches $28_1$ and $28_2$ the switch 67 is opened. The slide plate 60 can be displaced by means of the contact switches $28_1$ and $28_2$ only after the termination of the film. This occurs so that the film channel outside of the magazine is discharged out of a normal position. For this purpose the plunger is constructed in such a manner that the contact switches serve also as switching means to make slide plate 60 be attracted only when the plunger 64 is supplied with current.

The operation will be explained according to FIG. 7 and FIG. 8. Because at the termination of the film the contact switches $28_1$ and $28_2$ make a circuit and the locking means is disengaged, the switch 67 is made off by opening the cover of the film chamber and the supply of the plunger magnet 64 with current is interrupted, so that the support plate 60 slides upwards due to the strength of the spring 63 in the drawing and enters into a state as shown in FIG. 8. In that state the sprocket 27' is parted from the guide rollers 24 and 24' and the space between the film guide 22, 22' and those 26, 26' is also enlarged, so that the magazine 4 can be taken out along a direction vertical to the plane of FIG. 8. When a new magazine is loaded and the cover is closed, the switch 67 makes a circuit and the working iron piece of the plunger magnet 64 attracts the support plate 60 so that the support plate is slided downwards to form a certain determined film channel.

Figure 9:
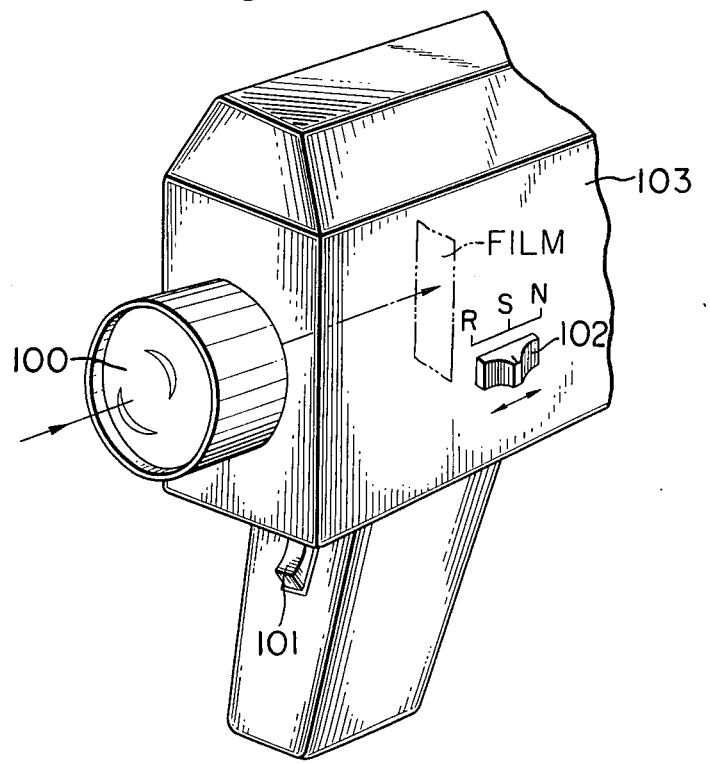
FIG. 9 shows in perspective a variation of the motion picture camera according to the invention to show the operating parts.
Figure 10:
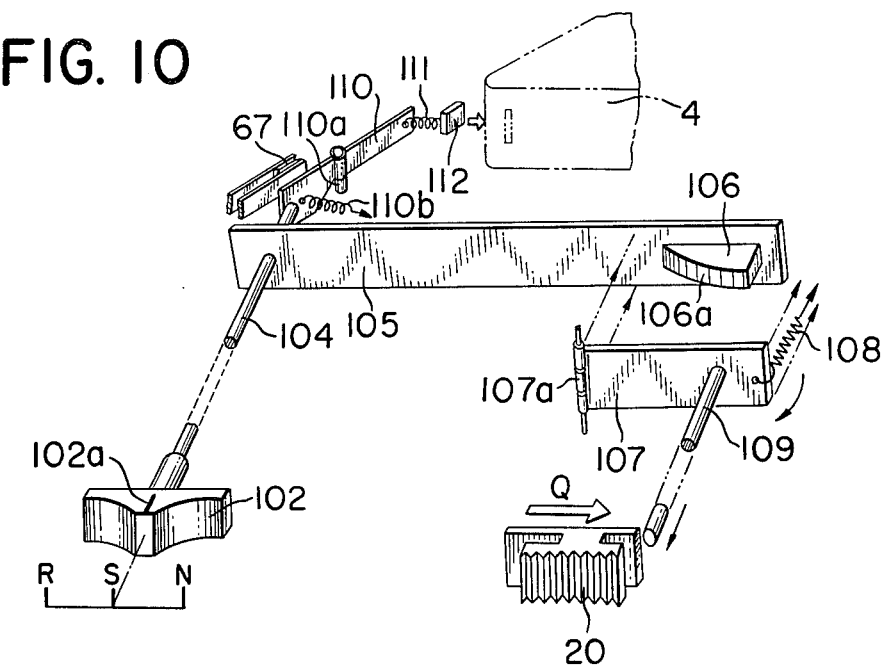
FIG. 10 shows the operating parts shown in FIG. 9 in detailed perspective.

FIGS. 9 and 10 show other variations of the motion picture camera according to the invention, in which camera a magazine capable of synchronous sound recording and an ordinary magazine can be selectively applied by means of a switching operation. In the drawings, 100 is an objective lens mounted on the camera body 103, 101 a shutter release button, and 102 a operating button to switch a synchronous sound recording over to an ordinary sound recording. The disposition of the switching means will be explained according to FIG. 10. The index "R", "S" and "N" on the camera side to be watched with the index 102a on the switching button 102 indicate respectively the state for synchronous sound recording, that ready for synchronous sound recording and that for the ordinary cranking without sound recording. Member 104 is an axis incorporated with the button 102, 105 a sliding plate incorporated with the axis 104, 106 a protrusion secured on the sliding plate 105 and presenting a curved surface 106a, whereby the swing plate 107 is pulled by a spring 108 in such a manner that the swing plate 107 is always kept in contact with the curved surface 106a. Member 109 is a pin mounted on the swing plate 107 and serves to lock the operating knob 20 of the cover 12. 110 is a lever rotatable around the axis 110a mounted on the camera body, whereby the one end can be engaged with one end of the axis 104, while the other end presents a compression spring 111, which presents at one end a member 112 serving to press the switching member 8 (see FIGS. 2, 3 and 4) of the magazine 4. Member 67 is a switch which can be engaged with the lever 110 and serves to operate the electromagnetic plunger 64.

When the index 102a of the switching knob 102, the sliding plate 105 is moved from the position in FIG. 10 further to the right, while at the same time the lever always pulled by the spring 110b along the anticlockwise direction is rotated along the anticlockwise direction and pull the member 112 mounted on the other end through the compression spring 111 out of the engaging position with the magazine. Thus the switching member 8 of the magazine is not pushed and therefore the film cannot be led out of the magazine 4, whereby it is possible to carry out an ordinary cranking without sound recording. Further the lift which the curved surface 106 on the sliding plate 105 gives to the swing plate 107 at this time is at minimum and the pin 109 takes the most retired position, so that the knob 20 can be moved freely along the direction Q. In this state for an ordinary cranking the cover 12 of the magazine chamber can be opened during cranking (see FIG. 6).

When the index 102a of the knob 102 is matched with the index "S" on the camera (FIG. 10), the sliding plate 105 is moved to a position shown in the drawing. Thus due to the engagement of the lever 110 with the axis 104 the lever 110 is rotated along the clockwise direction against the spring 110b in the drawing in such a manner that the signal member 112 to the magazine is pushed against the lever 8 of the magazine 4 to slide the lever 8, so that the film can be led out of the magazine (FIG. 4). At this time the sliding plate 105 has not been sufficiently moved to make the axis 109 on the swing plate 107 protrude to prevent the knob 20 from moving along the direction Q. Thus it is possible to open the cover 12 by operating the knob 20 as shown in FIG. 6. At this time the switch has not yet been made off and the film channel outside of the magazine remains discharged as shown for example in FIG. 8.

When the index 102a of the knob 102 is matched with the index "R" on the camera, the sliding plate 105 is moved further to the left in FIG. 10 and rotates the lever further along the clockwise direction by means of the axis 104 to make the switch 67 on, so that the film channel outside of the magazine is formed. Further by this movement of the sliding plate to the left the curved surface 106a engages the swing plate 107 in its maximum lift and rotates the plate 107 along the clockwise direction around the axis 107a against the spring 108. Thus, the pin 109 advances to the utmost reaching a position to control the end of the knob 20, whereby the further movement of the knob along the direction Q is restricted to lock the cover. The rotation of the lever 110 along the clockwise direction is absorbed by the compression spring 111 so that the member 112 is kept in a position to push the switching member 8. By this way in this position for synchronous sound recording the cover is prevented from opening and the synchronous sound recording can be carried out.

Figure 11:
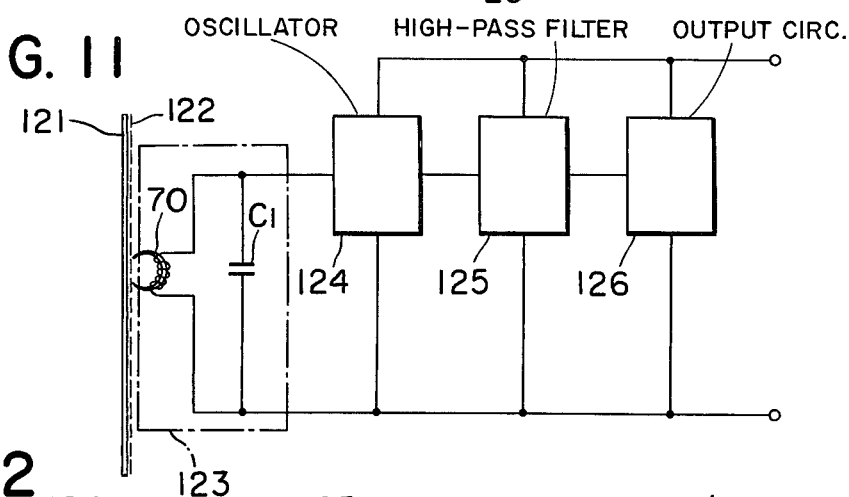
FIG. 11 shows a block wiring diagram of an electrical circuit of the motion picture camera of FIG. 7 and FIG. 8 to control operations such as discharge of the film channel outside of the magazine by detecting the magnetic coating provided on the film.
Figure 12:
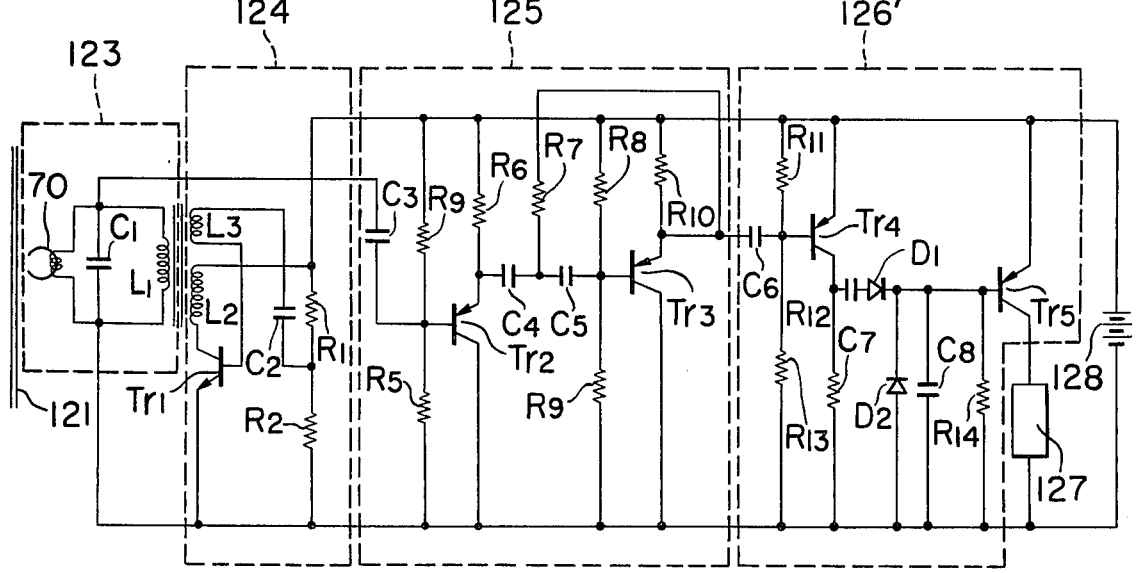
FIG. 12 shows an example of the electrical circuit of FIG. 11 in detail.

FIG. 11 shows a block wiring diagram of an electrical circuit to control a load, for example, the disengagement of the film channel outside of the magazine or the operation or the non-operation of the sound recording circuit including the optical or the magnetic head, by detecting the magnetic coating portion coated on the film for sound recording by the magnetic head. FIG. 12 shows the circuit components in detail. In the drawing 70 is a magnetic head disposed opposite to the film as shown in FIG. 7 and FIG. 8 in such a manner that it enters into a sliding engagement with the magnetic coating portion of the film. Member 121 is the film, while 122 is the magnetic coating portion. Member $C_1$ is a capacitor in parallel connection with the magnetic head 70 and forms a parallel resonance circuit 123. This circuit is connected with the following oscillating circuit 124, which is connected with a filter circuit 125 connected with an output circuit 126.

The parallel resonance circuit 123 and the oscillating circuit 124 are designed in such a manner that both circuits produce a certain determined frequency (A Hz) of oscillation, whereby the filter of the filter circuit 125 is designed in such a manner that the filter allows a passage of the frequency A Hz. When the film is fed and the magnetic coating portion on the film comes to the magnetic head 70, the inductance of the head 70 is changed in such a manner the circuit constant of the parallel resonance circuit is changed, whereby the oscillation frequency changes from A Hz to B Hz. When the magnetic coating portion of the film comes to the magnetic head if the filter is designed so as not to allow the passage of the frequency B Hz, it is possible to set the camera in the state for sound recording by operating lamps, relays, plungers and so on. It is also possible to indicate the existence of the film with magnetic coating portion in the camera, by detecting the existence of the magnetic coating portion, whereby further it is possible to lock the cover of the film chamber by operating plungers and the like.

Further details will be explained according to FIG. 12, 123 is a parallel resonance circuit consisting of a magnetic head 70, a capacitor $C_1$ and a coil $L_1$. Member 124 is an oscillating circuit working in magnetic connection with the parallel resonance circuit 123 and consists of a transistor $Tr_1$, coils $L_2$ $L_3$, a capacitor $C_2$ and resistances $R_1$ $R_2$. Member 125 is a high-pass filter circuit consisting of transistors $Tr_2$ $Tr_3$, capacitors $C_3$ $C_4$ and $C_5$ and resistances $R_4$ - $R_{10}$. Member 126' is an integration circuit consisting of transistors $Tr_4$, $Tr_5$, capacitors $C_6$, $C_7$, $C_8$, diodes $D_1$, $D_2$ and resistances $R_{11}$ - $R_{14}$. Member 127 is a load controlled of the output of this circuit 126', while 128 is an electrical source.

When the magnetic coating portion has not yet comes to the magnetic head 70, the oscillating circuit 124 is in a state to oscillate with a frequency $f_1$ which is determined by the constant of the magnetic head 70, the coils $L_1$ and $L_2$, by the magnetic matching constant between the coils $L_1$ and $L_2$ and by the constant of the capacitor $C_1$. Due to the passage of the magnetic coating portion by the magnetic head 70, the constant of the head 70 changes, while constants of other members do not. The magnetic permeability at the magnetic coating portion is higher than when the portion does not exist the inductance of the magnetic head 70 goes up so that the oscillating frequency goes down. Namely, the oscillating frequency of the oscillating circuit is changed from $f_1$ down to $f_2$. The filter circuit 125 allows the passage of the frequency $f_1$, cutting the frequency $f_2$. When the frequency of the outputs of the circuits 123, 124 is $f_1$, only the signal which passes through the filter circuit 125 is put in the transistor $Tr_4$, amplified by the transistor $Tr_4$, rectified by the diodes $D_1$, $D_2$, integrated by the capacitor $C_8$ and put to the base of the transistor $Tr_5$, whose conductivity is then destroyed so that the load 127 does not work.

When the magnetic coating portion of the film has passed by the magnetic head 70, the oscillating frequency of the oscillating circuit is changed to $f_2$, which signal is cut off by the filter circuit 125 in such a manner that there is no input signal for the transistor $Tr_4$ so that the A.C. output of the transistor $Tr_4$ becomes zero and the potential of the capacitor lowers, whereby the transistor $Tr_5$ becomes conductive and the load 127 is operatd with its output. Namely, when there is no magnetic coating portion on the film the load is no operated, while when there is, the load is operated and the indication lamp is lighted as mentioned above.

FIGS. 13 - 16 show an embodiment, in which the film feeding device according to the invention is applied, whereby the adaptors and the grip are demountably provided on the camera body and the film driving and the sound recording outside of the magazine are carried out.

Figure 13:
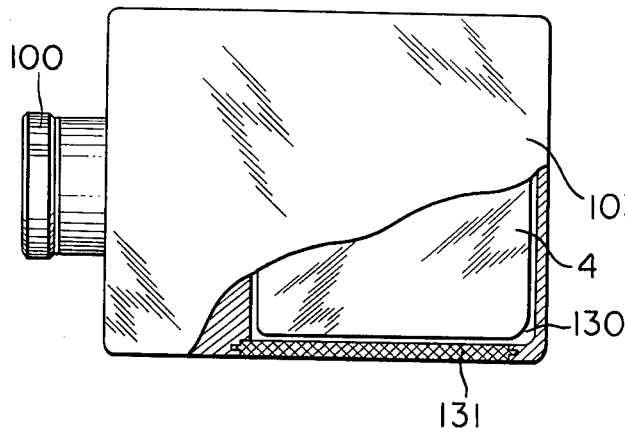
FIG. 13 shows a partially broken side view of the motion picture camera according to the invention, in which the film magazine of FIG. 1 to FIG. 4 can be used, whereby the film channel has not yet switched over to that outside of the magazine.

In FIG. 13, 100 is an objective lens being provided on the camera body 103. Member 130 is a film chamber, in which a magazine 4 as mentioned above or an ordinary magazine having no film channel outside of the magazine is loaded. Structure 131 is a separating wall demountable or openable and forming a part of the wall surface of the film chamber.

Figure 15:
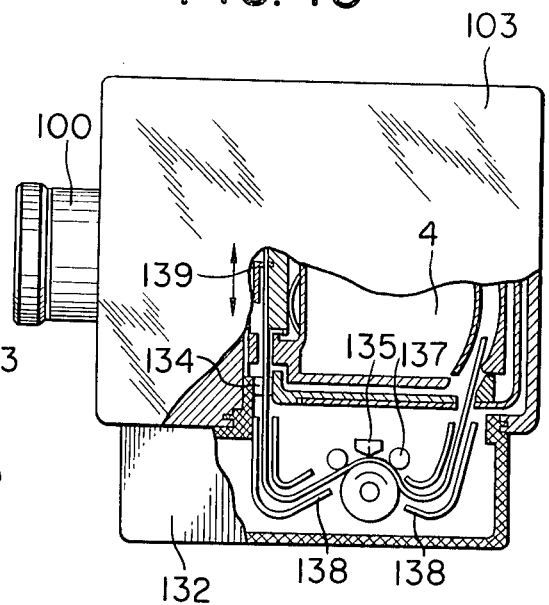
FIG. 15 shows a partially broken side view of the motion picture camera of FIG. 13, on which the adaptor of FIG. 14 is mounted.
Figure 14:
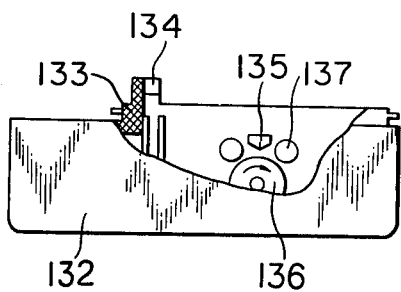
FIG. 14 shows a partially broken side view of an adaptor to be mounted demountably on the motion picture camera of FIG. 13.

FIG. 14 shows an adaptor mountable on the camera shown in FIG. 13 and capable of synchronous sound recording. In FIG. 15 shows this adaptor 132 mounted on the camera after the separating wall 131 of the camera shown in FIG. 13 has been taken out.

The adaptor 132 in FIG. 14 and FIG. 15 incorporates a switching signal member 134 which engages with the switching head 8A (FIG. 3) of the sliding member 8 of the magazine 4 with the mounting member 133 to the camera body 103.

It is also possible that the signal member 134 is not incorporated with the adaptor and provided independently.

The optical or the magnetic head to record sounds on the film may be any photoelectric or electromagnetic transducing means which responds to the output of the microphone incorporated with the adaptor or mountable on the adaptor, where for example the luminous diode can also be applied. In obtain a constant and stabilized running speed of the film opposite to such head device 135 the rollers or the sprocket is driven along the direction of arrow by a driving source not shown in the camera body or a driving source not shown in the adaptor. It is also possible to apply a driving system by means of the capstans and pinch-rollers. Members 137 are a pair of guide rollers, 138 film guides forming a film channel outside of the magazine.

When a magazine as mentioned before is loaded in a camera provided with an adaptor as mentioned above, the head of the switching member 8 of the magazine is pressed by the signal members 134 and the switching member 8 is moved to the right in the drawing. Thus in the lower part of the magazine (FIG. 4) an opening 22 is formed while the openings 6 and 6B align with each other so as to form a film channel. The reciprocated movement along the direction of arrow of the film feeding claws driven by a conventional driving source not shown in the drawing at the film gate 5, feed the film. The latter is exposed to the light, passes by the opening 22, led in the side of the adaptor for synchronous sound recording from the side of camera body, passes through the film channel formed by the guide 138, runs at the head and, after sounds being recorded, thereon passes through the film channel formed by the guide 138 and returns in the magazine chamber by the openings 6 and 6B of the magazine. Thus the synchronous sound recording with photographing becomes possible.

Figure 16:
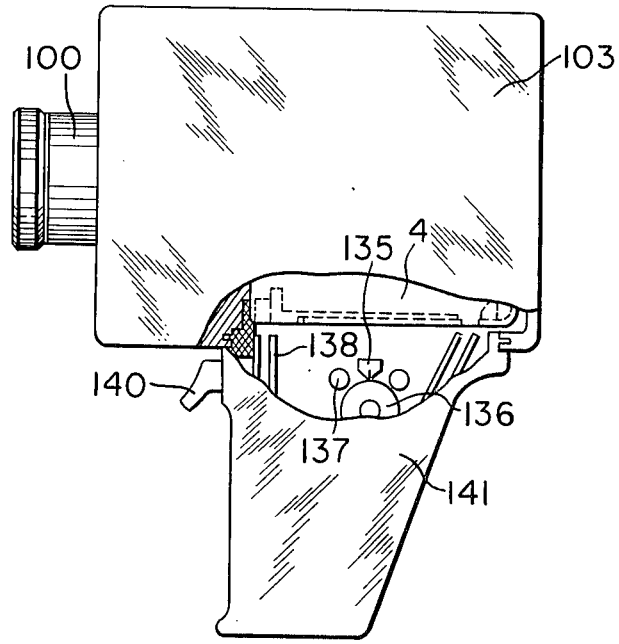
FIG. 16 shows a partially broken side view of a variation of the motion picture camera of FIG. 15.

FIG. 16 shows an embodiment, in which the above mentioned adaptor for sound recording serves as the grip. The common parts bear the same figures, and their explanation is omitted. In case of the synchronous sound recording the operation can be simplified if the button for synchronous sound recording works in functional connection with the shutter release button 140 as shown in FIG. 16. It is also possible to use conventional techniques to make the shutter release button operate in functional connection with the sound recording according to the necessity for synchronous sound recording, so that its explanation is also omitted.

According to the above mentioned embodiment of the film channel disengaging device, either the means to form the film channel or the means to drive the film is disengaged. Thus it is also possible to disengage both of them.

The present invention, providing the disposition and function as mentioned above, is very useful for operating this kind of the motion picture camera, because it is possible to completely avoid the inconvenience of the knob being opened by mistake before termination of film and the film in the film chamber being exposed to the light.

Further it is possible to disengage the film channel outside of the magazine in functional connection of the opening of the cover and to take out the film in a position to pass through the channel together with the magazine, when the film is terminated or broken. This kind of device facilitates the operation when the film channel is out of order and very useful for camera operation.

What is claimed is:

1. A motion picture camera usable with a film magazine containing a roll of sound signal recordable photographic film comprising:
a housing forming a chamber adapted to receive said magazine:
a cover mounted on the housing which is openable and closable with respect to the chamber for closing the chamber;
recording means in the housing for recording the sound signals on said film, said recording means being adapted to engage the film for sound recording at a position in the path of the film on which sound recording is effected;
film transport means in the housing for continuously transporting the film and engaging the film in the sound recording position;
support means in the housing for supporting a portion of said film transport means, said support means being movable to effect engagement of said transport means with the film; and
positioning means in the housing for moving said movable support means to the sound recording position in response to closing of the cover;
said positioning means including switch means mounted in one of said cover and housing and responsive to opening and closing of the cover, and electromagnetic means responsive to said switch means;
said electromagnetic means being operatively coupled to said support means for moving said support means.

2. A camera as in claim 1, wherein said recording means is movably mounted within the chamber.

3. A camera as in claim 1, wherein said film transport means includes:
film driving means disposed in the chamber at a predetermined position in the path of the film for continuously driving the film, and roller means supported by said support means and shiftable between a first position in which it operatively engages the film with the driving means for continuously transporting the film and a second position in which it allows the film to disengage from the driving means, said support means being movable to shift said roller means between said first and second positions.

4. A camera as in claim 3, wherein said recording means includes a magnetic head adapted to engage with the film for recording sound signals on the film at the sound recording position.

5. A motion picture camera system which can use a film magazine containing a film capable of simultaneous recording of picture information and sound signals, comprising:
a camera body, having:
a first chamber to house the film magazine, said first chamber having at least one opening,
photo-taking means to record picture information on said film,
first film driving means to intermittently drive said film during photographing, said driving means being operatively engageable with the film for film driving, and
removable housing means which can close the opening of said first chamber so it is light-tight; and,
an attachment unit which is attachable to and detachable from said camera body, said attachment unit, having:
a unit housing which can light-tightly close the opening of said first chamber so it is light-tight in place of said removable housing means,
a second chamber for sound recording, said second chamber being connected to said first chamber through said opening as said attachment unit is attached to the camera body,
sound signal recording means for recording sound signals on the film, said recording means being provided in said second chamber and being operatively engageable with the film for sound recording, and
second film driving means to continuously drive said film at a time of sound recording, said driving means being operatively engageable with the film for film driving, so that photographing accompanied by sound signal recording is made possible.

6. A motion picture camera system according to claim 5, in which said recording means is fixedly mounted in said second chamber at a position along a film path which allows sound recording.

7. A motion picture camera system according to claim 6, in which said second driving means is disposed in said second chamber at a predetermined position in said film path.

8. A motion picture camera system according to claim 7, in which said attachment unit further includes a film guide means provided within said second chamber to define a predetermined film path for sound recording.

9. A motion picture camera system according to claim 5, in which said attachment unit is made as a grip to hold said camera body at the time of photographing.

10. A motion picture camera system according to claim 9, in which said grip has a manually operable control means to actuate said first driving means, said recording means and said second driving means.

* * * * *